United States Patent [19]
Davis et al.
[11] 4,167,504
[45] Sep. 11, 1979

[54] PVC PLASTICIZED WITH MONOCYCLOHEXYLBIPHENYL

[75] Inventors: Brian C. Davis, Wilmington; Robert P. Bryer, Claymont, both of Del.

[73] Assignee: Sun Oil Company of Pennsylvania, Philadelphia, Pa.

[21] Appl. No.: 821,012

[22] Filed: Aug. 1, 1977

[51] Int. Cl.[2] .......................... C08L 27/06; C08J 3/18; C08K 5/01

[52] U.S. Cl. ............................ 260/33.6 UA; 528/497; 525/1

[58] Field of Search ............................ 528/497; 526/1; 260/33.6 UA

[56] References Cited

U.S. PATENT DOCUMENTS

| | | | |
|---|---|---|---|
| 2,115,524 | 4/1938 | Hochwalt | 260/33.6 R |
| 2,925,398 | 2/1960 | Coran | 260/45.7 |

OTHER PUBLICATIONS

Voskresenskii, V. A. et al, Chem. Abst., 62, 14,886 g, (1965).

Encyclopedia of Chem. Technology, (Kirk-Othmer), vol. 15, p. 740, (1968).

*Primary Examiner*—C. A. Henderson
*Attorney, Agent, or Firm*—J. Edward Hess; Donald R. Johnson; Paul Lipsitz

[57] ABSTRACT

In the process of plasticizing polyvinylchloride with an alkyl biphenyl plasticizer, the improvement which comprises using as plasticizer a composition, preferably obtained by alkylation of biphenyl with cyclohexene, and containing at least about 85% of monocyclohexylbiphenyl.

2 Claims, No Drawings

PVC PLASTICIZED WITH MONOCYCLOHEXYLBIPHENYL

Alkylbiphenyl compounds are known in the art for use as plasticizers (U.S. Pat. Nos. 2,172,391 and 2,115,524). Polycyclohexylbiphenyls containing at least three cyclohexyl groups are disclosed as plasticizing agents in U.S. Pat. No. 2,263,448. Partially hydrogenated polyphenyls are disclosed as plasticizers for vinyl polymers in U.S. Pat. Nos. 2,115,524 and 2,925,398. Partial hydrogenation (generally, at least about 20%) of a polyphenyl, such as terphenyl, results in a mixture comprised of monocyclohexylbiphenyl, dicyclohexylbiphenyl, and other terphenyl derivatives. Such mixtures are used commercially as PVC plasticizers.

One of the problems associated with all plasticizing materials is that of compatibility with the substrate into which it is milled. It is extremely important that the plasticizers remain in the treated material and not bleed to the surface or otherwise be removed from a complete distribution throughout the plastic. It has now been found that by use of a highly specific alkyl biphenyl as plasticizer, improved compatibility with polyvinylchloride resins is obtained.

In accord with the invention, polyvinylchloride resins are plasticized with a composition containing at least about 85% of monocyclohexylbiphenyl and such plasticizer will be preferably a composition obtained by alkylation of biphenyl with cyclohexene, and containing at least about 85% by weight of monocyclohexylbiphenyl.

The preparation of the monocyclohexylbiphenyl composition is straight-forward and may employ the well known Friedel-Crafts synthesis using an aluminum chloride catalyst and using pseudocumene saturated with dry HCl as the solvent medium. Because a mixture of products is obtained by such alkylation it may be necessary to separate a portion containing at least about 85% of the monocyclohexylbiphenyl for use in this invention. A preferred means for such separation is simple distillation, the desired product being obtained as a first cut after unreacted starting materials. An alternative method to increase the alkylation mixture to the desired level of monocyclohexylbiphenyl is transalkylation, whereby isomer distribution is changed, as is known in the art. It will be understood that the composition for a specific boiling point range is dependent on reaction conditions, e.g. catalyst, temperature, and especially biphenyl to cyclohexene molar ratios. The data specifically shown below results from a 1:1 biphenyl to cyclohexene molar ratio reaction with the pseudo cumene—$AlCl_3$—HCl catalyst. After the monocyclohexylbiphenyl cut was taken, all other distillation cuts were added to another reaction vessel with fresh catalyst and another equivalent of cyclohexene was added to produce more product.

The following table indicates the components found in a first product distillation cut at 155°–220° C. and 4 mm/Hg of the product obtained by a diphenyl alkylation with cyclohexene as above described and, for comparison, the table includes the components of a commercial polyvinylchloride plasticizer obtained by hydrogenation of terphenyl ("HP-40" sold by Monsanto).

TABLE I

COMPOSITION OF MONOCYCLOHEXYLIPHENYL PLASTICIZER MIXTURE AND MONSANTO'S "HB-40 "[1]

| Compound | Molecular Weight | % Monocyclohexylbiphenyl | "HB-40" |
|---|---|---|---|
| 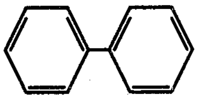 | | | |
| (Biphenyl) | 154 | 0.3 | 0.6 |
| (Methyl and dimethylbiphenyls) | 168, 182 | 0.2 | 0.7 |
| 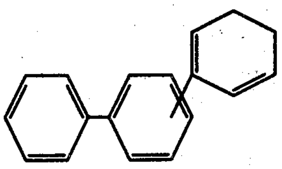 | | | |
| (Terphenyls) | 230 | 0.0 | 12.1 |
| 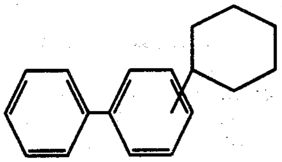 | | | |
| (Monocyclohexylbiphenyl) | 236 | 88.3 | 39.5 can also include 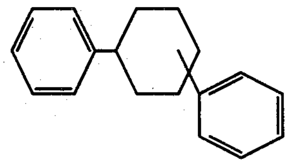 |

TABLE I-continued

COMPOSITION OF MONOCYCLOHEXYLIPHENYL PLASTICIZER MIXTURE AND MONSANTO'S "HB-40"[1]

| Compound | Molecular Weight | % Monocyclohexylbiphenyl | "HB-40" |
|---|---|---|---|
| 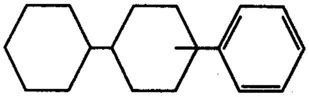 | 242 | 0.2 | 33.5 |
| 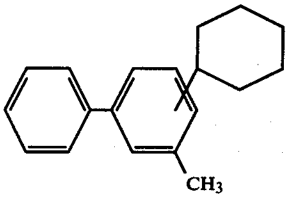 | 250 | 1.3 | 0.0 |
| 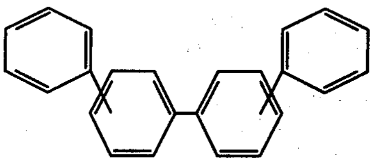 | 306 | 0.0 | 1.7 |
| 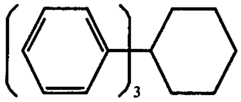 | 312 | 0.1 | 3.4 |
| 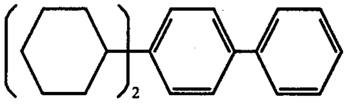 | 318 | 6.8 | 1.9 |
| 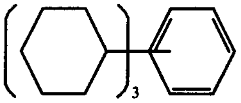 | 324 | 0.0 | 0.3 |

[1]A variety of other molecular weights are found for both mixtures in small amounts, 3 i.e., less than 0.5%.
For example:
Monocyclohexylbiphenyl: 174, 188, 208, 234, 232, 332
"HB-40": 160, 174, 232, 260, 158, 186, 228, 170, 240

As can be seen from Table 1, the commercial product contains only about 40% of monocyclohexylbiphenyl and has significant amounts of terphenyls (12.1%) and phenylbicyclohexyl (33.5%).

Significant physical characteristics of the plasticizer of this invention are compared with "HB-40" in Table II.

TABLE II

| | MONOCYCLOHEXYLBIPHENYLS | "HB-40" |
|---|---|---|
| Viscosity SUS/100F | 186 | 140 |
| Viscosity SUS/210F | 41.4 | 39.0 |
| Pour Point, °F.* | −15 | −15 |
| Approximate Boiling Range, °F. | 600–800 | 600–800 |
| Color (ASTM D1500) | 0.5 | L 1.0 |

*On long standing some crystallization of the para isomer takes place.

Samples of these two materials were tested for heat and ultraviolet light stability as an indication of the potential for discoloring PVC formulations with time (See Table III). It can be seen from Table III that the monocyclohexylbiphenyls have significantly better sunlight stability than "HB-40" and slightly better heat stability.

TABLE III

| Initial | Monocyclohexylbiphenyl | "HB-40" |
|---|---|---|
| Optical Density (O.D.) 525 nm | 1.7 | 1.8 |
| Transmission (T) @ 240 nm, % | 90.1 | 67.3 |
| Color (D1500) | 0.5 | L 1.0 |
| UV Aged, 45 Hrs. | | |
| Optical Density, 525 nm | 1.2 | 5.0 |
| T @ 520 nm, % | 82.8 | 21.8 |
| Color (D1500) | 0.5 | L 1.5 |
| Heat Aged, 6 Hrs/300° F. | | |
| Optical Density, 525 nm | 1.9 | 2.0 |
| T @ 240 nm, % | 89.1 | 62.0 |
| Color (D1500) | 0.5 | L 1.0 |

Both the above sample and a sample containing 87% dicyclohexylbiphenyls and 4% monocyclohexylbiphenyls (a distillation cut of the alkylated product over 250° to 320° C. at 4 mm/Hg) were formulated with PVC at 40% replacement of the dioctylphthalate primary plasticizer. All samples were compatible (showed little "bleeding" of secondary plasticizer) at this replacement level. However, one of the most significant advantages of the monocyclohexylbiphenyls over the mixture of partly hydrogenated terphenyls is compatibility. The compatibility limit of "HB-40" is about 60% replacement of DOP, but monocyclohexylbiphenyls are compatible to about the 90% replacement level.

The monocyclohexylbiphenyl plasticized PVC is as impermeable to water as samples plasticized with hydrogenated terphenyls and dicyclohexylbiphenyls, but is much more resistant to solvent extraction, especially when the DOP replacement levels approach compatibility limits. This is clearly evident from the data of Table IV.

TABLE IV

| Sample | Monocyclo-hexylbiphenyl | | "HB-40" | Dicyclohexyl-biphenyl |
|---|---|---|---|---|
| DOP Replacement, % | 40 | 80 | 40 | 40 |
| Solvent | | | | |
| Water, 200° F. | | | | |
| Weight Gain, % | 0.1 | 0.0 | 0.1 | 0.1 |
| Kerosene, 75° F. | | | | |
| Weight Loss, % | 4.2 | 2.1 | 12.2 | 8.0 |

The aged and unaged physical properties of PVC formulated as shown in Table V with each of the three samples above were determined and are tabulated in Table VI. Properties are quite similar for the same replacement levels before and after aging.

TABLE V

| | PVC Formulations (phr) | | | |
|---|---|---|---|---|
| Sample | Monocyclo-hexylbiphenyl | | "HB-40" | Dicyclohexyl-biphenyl |
| (PVC) (Geonioz) | 100 | 100 | 100 | 100 |
| Stearic Acid | 0.6 | 0.6 | 0.6 | 0.6 |
| Epoxide Stabilizer | 7.0 | 7.0 | 7.0 | 7.0 |
| DOP | 42.0 | 14.0 | 42.0 | 42.0 |
| Secondary Plasticizer | 28.0 | 56.0 | 28.0 | 28.0 |

TABLE VI

| | Properties of Formulations | | | |
|---|---|---|---|---|
| DOP Replacement, % | 40 | 80 | 40 | 40 |
| Unaged Properties | | | | |
| Tensile, psi | 2100 | 2235 | 2250 | 2300 |
| Elongation, % | 400 | 325 | 375 | 350 |
| Modulus, S-300 | 1700 | 2200 | 1950 | 2100 |
| Hardness, Shore A | 72 | 73 | 75 | 73 |
| Aged Properties, 48 Hrs/212F | | | | |
| Tensile, psi | 2235 | 2625 | 2350 | 2300 |
| Elongation, % | 325 | 225 | 325 | 375 |
| Modulus, S-300 | 2250 | | 2275 | 2150 |
| Hardness, Shore A | 80 | 89 | 80 | 79 |
| Weight Loss, % | 8.4 | 13.7 | 9.0 | 0.8 |
| Est. D1500 Color | 1.0 | 1.0 | 1.0 | 1.0 |

It is clear from the above data that a superior plasticized PVC product is obtained by using a plasticizing composition comprising at least about 85% by weight of monocyclohexylbiphenyl.

The invention claimed is:

1. In the process of plasticizing polyvinylchloride with an alkyl biphenyl plasticizer, the improvement which comprises using as plasticizer a composition containing from about 85% to about 88.3% of monocyclohexylbiphenyl.

2. In the process of plasticizing polyvinylchloride with an alkyl biphenyl plasticizer, the improvement which comprises using as plasticizer a composition containing from about 85% to about 88.3% of monocyclohexylbiphenyl obtained by alkylation of 1 mole of biphenyl with 1 mole of cyclohexene.

* * * * *